July 30, 1940.　　　J. O. HOLMBERG　　　2,209,332
HYDRAULIC KEEL BENDER INDICATOR
Filed March 31, 1939
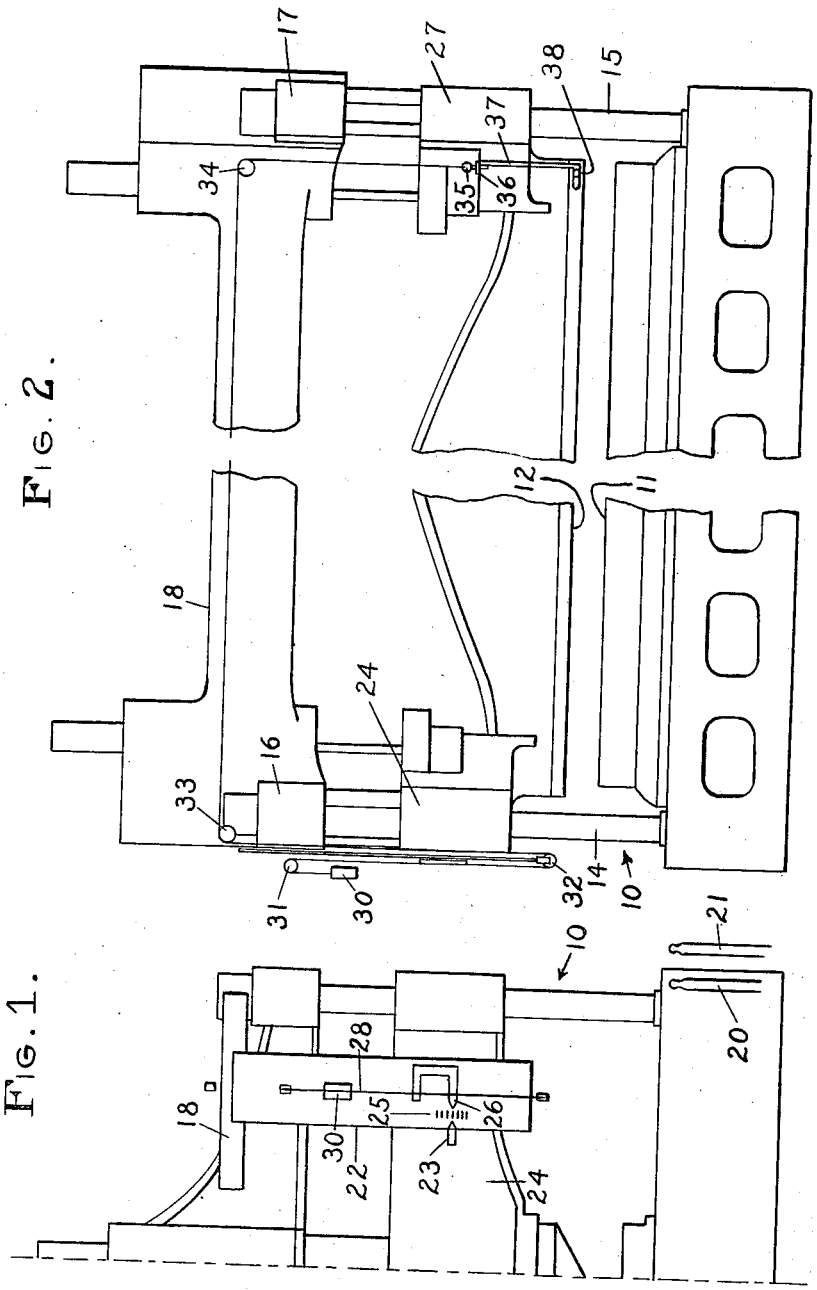
INVENTOR
JOHAN O. HOLMBERG
BY
　　　　ATTORNEY Patented July 30, 1940

2,209,332

UNITED STATES PATENT OFFICE 2,209,332

HYDRAULIC KEEL BENDER INDICATOR

Johan O. Holmberg, East Weymouth, Mass.

Application March 31, 1939, Serial No. 265,086

4 Claims. (Cl. 33—181)

(Granted under the act of March 3, 1883, as amended April 30, 1928; 370 O. G. 757)

This invention relates to a hydraulic keel bender indicator, and has for an object to provide means whereby the operator of the hydraulic keel bender may maintain the ram in a horizontal position from the block or may place it at any desired angle to the block.

A further object of this invention is to provide an indicator which may be attached to an existing hydraulic keel bender indicator and enable the operator to maintain the desired angle of the ram to the block, even though the keel bender may have considerable lost motion in the ram hinge pins.

With the foregoing and other objects in view, the invention consists in the construction, combination and arrangement of parts hereinafter described and illustrated in the drawing, in which, Fig. 1 is a fragmentary side elevation of a hydraulic keel bender with the indicator of this invention applied thereto; and Fig. 2 is a front elevation view of the keel bender and indicator of Fig. 1.

There is shown at 10 a hydraulic keel bender having the anvil or block 11 against which is to be operated the ram 12 in the usual way, the ram 12 being raised and lowered on columns 14 and 15 by hydraulic pressure through the cylinders 16 and 17 on the machine frame 18. As customary, two operating levers 20 and 21 are provided, one for controlling the pressure to the cylinder 16 and the other controlling the pressure to the cylinder 17, whereby the operator can control the operation of each end of ram 12, and thus its angle relative to the block or anvil 11.

The controlling levers 20 and 21 are located at the side of the machine, and in any case, it would be difficult for the operator to maintain the ram 12 at the desired angle, especially if there is any lost motion in the ram hinge pins. To overcome this defect the indicator of this invention is provided. This indicator includes an indicator board 22 secured to a fixed part of the machine, as for instance, the machine frame 18. A pointer 23 is affixed directly to the cross-head 24 at one end of the ram 12, the pointer 23 being in a position to move up and down over the indicator board 22, which carries a series of vertically spaced gauge marks 25. Another pointer 26 likewise moves up and down the gauge marks 25 of indicator 22, the pointer 26 being operated from the opposite end 27 of the ram 12 by being affixed to a small diameter flexible wire rope 28. Thus pointers 23 and 26 each reproduce the exact motion of their respective ends. One end of the rope 28 has a counter weight 30 affixed thereto, the rope then passing over a plurality of fixed sheaves 31, 32, 33 and 34, and is adjustably secured at its other end by means of a threaded eye-bolt 35, threaded through a nut 36 affixed to the top of a rod 37 which has been welded as at 38 to the opposite end of the ram 12. The threaded eye-bolt 35 permits proper adjustment so as to bring the pointers 26 and 23 in exact alignment when the ram is at exactly a level position relative to the anvil or block 11, while the counter weight 30 serves to prevent any lost motion in the indicator.

The gauge marks 25 may be spaced apart so as to indicate a certain degree of angle of the ram 12 for each gauge mark, so that by maintaining the pointers one or more gauge marks apart the operator can maintain the ram at a desired angle.

In operation, the operator operates the hydraulic keel bender in the customary manner by manipulating the levers 20 and 21. If he desires to maintain the ram 12 absolutely level, he has only to wach the pointers 23 and 26 and see that they stay in horizontal alignment with each other as they move down the indicator board 22 over the gauge marks 25, while if he desires a certain angle one way or the other of the ram 12 to the block or anvil 11, he must merely maintain the pointer 26 a certain distance above or below the pointer 23 as he manipulates the control levers 20 and 21.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. An indicator for indicating the angle of the ram of a hydraulically operated machine having separately controlled hydraulic cylinders at opposite ends thereof for operating the ram, comprising a pair of movable adjacent pointers, means operatively connecting one of said pointers to one end of the ram for moving said pointer in accordance with said end of the ram, and means operatively connecting the other of said pointers to the other end of said ram for moving said other pointer in accordance with the movement of said other end of the ram.

2. An indicator for indicating the angle of the ram of a hydraulically operated machine having separately controlled hydraulic cylinders at opposite ends thereof for operating the ram, comprising a pair of movable adjacent pointers, one of said pointers being affixed to one end of the ram, and means operatively connecting the other of said pointers to the other end of the ram for controlling the movement of said other of said pointers relative to said first pointer in accordance with the movement of said other end of the ram relative to the first mentioned end of said ram.

3. An indicator for indicating the angle of the ram of a hydraulically operated machine having separately controlled hydraulic cylinders at opposite ends thereof for operating the ram, comprising a pair of movable pointers, one of said pointers being affixed to one end of the ram, means for controlling the movement of the other of said pointers in accordance with the movement of the other end of the ram, said pointer-controlling means comprising a flexible member to which said pointer is affixed adjacent one end and adjustable means anchoring the other end of said flexible member to said other end of the ram.

4. An indicator for indicating the angle of the ram of a hydraulically operated machine having separately controlled hydraulic cylinders at opposite ends thereof for operating the ram, comprising a pair of movable pointers, one of said pointers being affixed to one end of the ram, means operatively connecting the other of said pointers to the other end of the ram for controlling the movement of said other of said pointers relative to said first pointer in accordance with the movement of said other end of the ram relative to the first end of said ram, a fixed indicator board over which said pointers are moved adjacent each other and gauge marks on said board assisting in determining the alignment or relative displacement of said pointers.

JOHAN O. HOLMBERG.